United States Patent [19]

Lankton et al.

[11] Patent Number: 5,057,125
[45] Date of Patent: Oct. 15, 1991

[54] PROCESS FOR THE TREATMENT OF VENT GAS CONTAINING ORGANIC HALIDE COMPOUNDS

[75] Inventors: Steven P. Lankton, Wheeling, Ill.; Richard T. Maurer, Nanuet, N.Y.; Robert B. James, Jr., Northbrook, Ill.

[73] Assignee: UOP, Des Plaines, Ill.

[21] Appl. No.: 522,719

[22] Filed: May 14, 1990

[51] Int. Cl.⁵ .............................................. B01D 53/04
[52] U.S. Cl. ........................................... 55/23; 55/71; 55/74
[58] Field of Search .................... 55/23, 71, 74, 76

[56] References Cited

U.S. PATENT DOCUMENTS

| | | |
|---|---|---|
| 2,214,368 | 9/1940 | Greensfelder et al. ................. 55/23 |
| 2,274,094 | 2/1942 | Rupp ........................................ 55/23 |
| 3,286,442 | 11/1966 | Wylegala ................................. 55/23 |
| 3,807,138 | 4/1974 | Bellisio ..................................... 55/71 |
| 4,293,317 | 10/1981 | Kovach ..................................... 55/71 |
| 4,557,921 | 12/1985 | Kirsch et al. ....................... 55/71 X |
| 5,000,006 | 3/1991 | Itoh et al. ........................... 55/23 X |

*Primary Examiner*—Richard L. Chiesa
*Attorney, Agent, or Firm*—Thomas K. McBride; John G. Tolomei; John G. Cutts, Jr.

[57] ABSTRACT

A process for the removal of organic halide compounds from an effluent waste gas wherein the waste gas is sequentially compressed to separate water vapor and organic halide compounds, and to contact the resulting compressed gas having a reduced concentration of organic halide compounds with an adsorbent to produce an effluent waste gas containing essentially no detectable quantities of organic halide compounds.

16 Claims, 1 Drawing Sheet

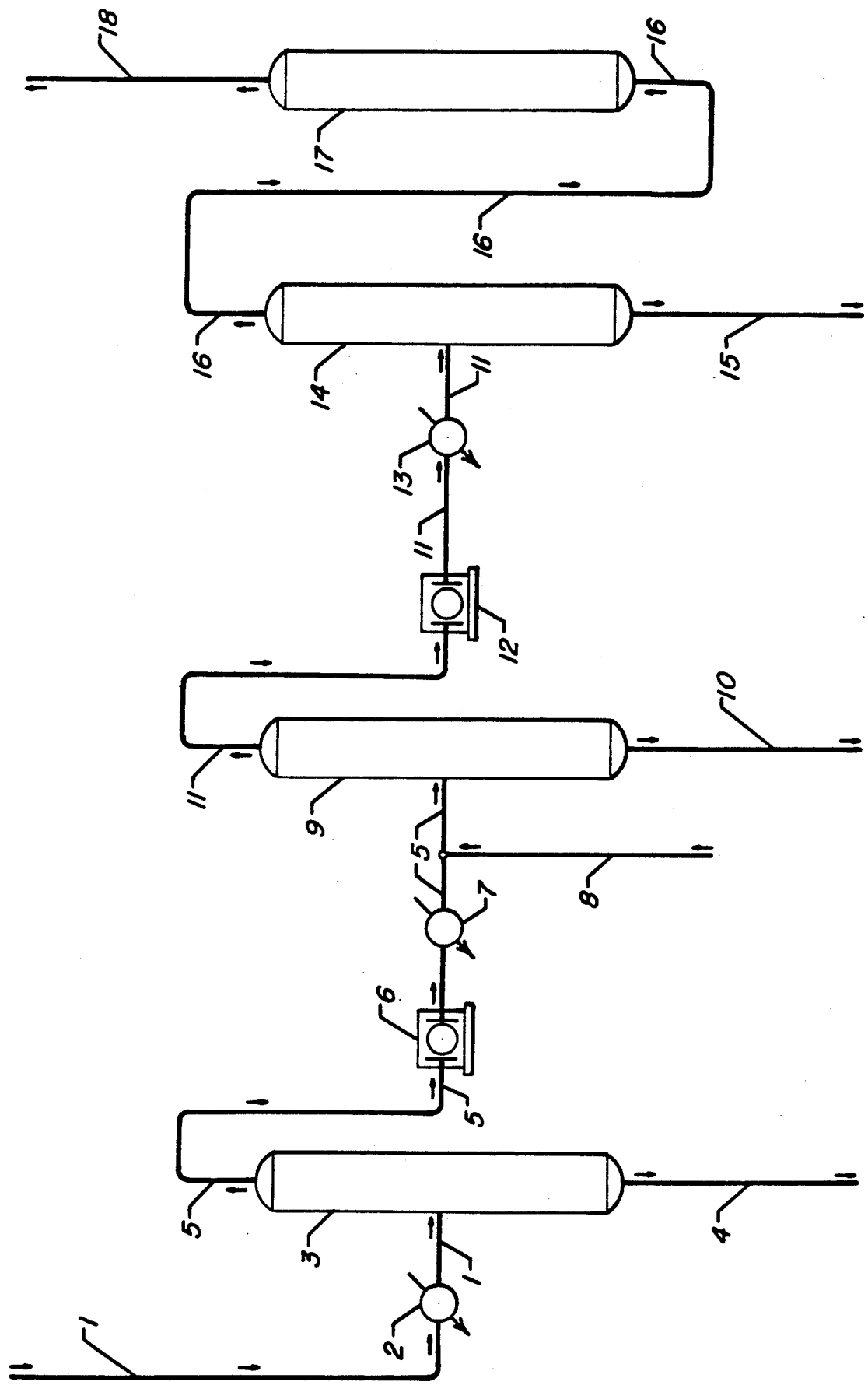

PROCESS FOR THE TREATMENT OF VENT GAS CONTAINING ORGANIC HALIDE COMPOUNDS

BACKGROUND OF THE INVENTION

The field of art to which this invention pertains is the treatment of vent gas containing organic halide compounds. An effluent gas from a petrochemical manufacturing plant, for example, requires treatment before being released to the atmosphere. More specifically, the invention relates to a process for the removal of organic halide compounds from an effluent waste gas containing organic halide compounds and water vapor which process comprises (a) compressing the effluent waste gas in a first compression zone to produce a condensed water vapor liquid phase and a first gaseous phase having a pressure greater than that of the effluent waste gas and a reduced concentration of water vapor; (b) compressing the first gaseous phase from step (a) to produce a condensed organic halide liquid phase and a second gaseous phase having a pressure greater than that of the first gaseous phase and having a reduced concentration of organic halide compounds; (c) contacting the second gaseous phase containing residual quantities of organic halide compounds in an adsorption zone with an adsorbent which selectively retains organic halide compounds; and (d) recovering an effluent waste gas containing reduced quantities of organic halide compounds from said adsorption zone.

BRIEF SUMMARY OF THE INVENTION

The present invention is a process for the removal of organic halide compounds from an effluent waste gas wherein said waste gas is sequentially compressed to separate water vapor and organic halide compounds, and to contact the resulting compressed gas having a reduced concentration of organic halide compounds with an adsorbent to produce an effluent waste gas containing essentially no detectable quantities of organic halide compounds.

One embodiment of the invention may be characterized as a process for the removal of organic halide compounds from an effluent waste gas containing organic halide compounds and water vapor which process comprises: (a) compressing the effluent waste gas in a first compression zone to produce a condensed water vapor liquid phase and a first gaseous phase having a pressure greater than that of the effluent waste gas and a reduced concentration of water vapor; (b) compressing the first gaseous phase from step (a) to produce a condensed organic halide liquid phase and a second gaseous phase having a pressure greater than that of the first gaseous phase and having a reduced concentration of organic halide compounds; (c) contacting the second gaseous phase containing residual quantities of organic halide compounds in an adsorption zone with an adsorbent which selectively retains organic halide compounds; and (d) recovering an effluent waste gas containing reduced quantities of organic halide compounds from said adsorption zone.

Another embodiment of the invention may be characterized as a process for the removal of organic chlorides from an effluent waste gas containing organic chloride and water vapor which process comprises: (a) compressing the effluent waste gas in a first compression zone to produce a condensed water vapor liquid phase and a first gaseous phase having a pressure greater than that of the effluent waste gas and a reduced concentration of water vapor; (b) compressing the first gaseous phase from step (a) to produce a condensed organic chloride liquid phase and a second gaseous phase having a pressure greater than that of the first gaseous phase and having a reduced concentration of organic chloride; (c) contacting the second gaseous phase containing residual quantities of organic chloride in an adsorption zone with an adsorbent which selectively retains organic chloride; and (d) recovering an effluent waste gas containing reduced quantities of organic chloride from said adsorption zone.

Other embodiments of the present invention encompass further details such as preferred waste gas streams which are utilized as feedstock, adsorbents and operating conditions, all of which are hereinafter disclosed in the following discussion of each of these facets of the invention.

BRIEF DESCRIPTION OF THE DRAWING

The drawing is a simplified flow diagram of a preferred embodiment of the present invention.

DETAILED DESCRIPTION OF THE PREFERRED EMBODIMENT

The present invention provides an improved process for the removal of organic halide compounds from an effluent waste gas containing organic halide compounds. A wide variety of waste gas streams are to be candidates for feed streams in accordance with the process of the present invention. Examples of waste gas streams which are suitable for treatment by the process of the present invention are industrial waste gas streams which contain organic halides such as vinyl chloride, chloroethane, dichloroethane, dichloroethylene, chloroform, and carbon tetrachloride, for example.

In accordance with the subject invention, an effluent waste gas containing organic halide compounds is temperature-adjusted and compressed in a compression zone to increase the pressure of the waste gas. The resulting compressed gas is cooled to produce an aqueous phase condensation product and a gaseous phase having a reduced water vapor concentration. Before the waste gas is first compressed, it is preferred that the temperature is adjusted to a level which is suitable for introduction into a gas compressor. In the case where the temperature of the effluent gas exceeds the preferred temperature for use in a conventional gas compressor, it is preferred that the effluent gas is cooled. Suitable gas temperatures for feed to a gas compressor range from about 40° F. (4° C.) to about 130° F. (54° C.).

The resulting gaseous phase having a reduced water vapor concentration after having been compressed in a first compression zone and cooled is compressed in a second compression zone and cooled to produce a liquid phase containing predominantly organic halide compounds and a gas stream containing reduced quantities of organic halide compounds. In a preferred embodiment of the present invention, a non-condensible recycle gas stream comprising trace quantities of organic halide compounds is also introduced into the second compression zone. This recycle gas stream is produced during the regeneration of the adsorption zone.

Since it is a primary objective of the present invention to produce a final effluent gas having essentially no detectable concentration of organic halide compounds, the gas stream containing reduced quantities of organic halide compounds as recovered hereinabove is contacted in an adsorption zone with an adsorbent which selectively retains organic halide compounds. The resulting effluent gas from the adsorption zone is produced with essentially no detectable concentration of organic halide compounds.

The operating pressures employed in the compression zones employed in the present invention depend upon the characteristics and composition of the waste gas containing organic halide compounds which gas is fed to the instant process. Suitable operating pressures may be selected from the range from about 10 psig (68.9 kPa gauge) to about 1000 psig (6895 kPa gauge). Generally, each compression zone may have one or more stages of compression along with any suitable attendant cooling situated between the compression stages.

The first compression zone is conducted at a pressure which produces a liquid phase containing condensed water vapor and the second compression zone is conducted at a higher pressure than the first compression zone and thereby produces a condensed organic halide liquid phase along with some water.

The adsorption zone may contain any suitable adsorbent which selectively retains organic halide compounds. Depending upon the composition of the gas feed to the process of the present invention, adsorbents may be selected from the group consisting of alumina, silica, silica gel, silica-alumina, clay, crystalline aluminosilicates, activated carbon and admixtures thereof. Each adsorbent may not necessarily achieve equal results.

The adsorption zone may be operated at any suitable pressure but is preferably maintained at a pressure no greater than the pressure utilized to condense the organic halide which is conducted as described hereinbefore. The adsorption zone may suitably be operated at conditions which include a pressure from about 10 psig (68.9 kPa gauge) to about 1000 psig (6895 kPa gauge), a temperature from about 40° F. (4° C.) to about 200° F. (93° C.) and a gas hourly space velocity from about 0.1 to about 1000. Operating conditions of the adsorption zone are preferably selected to produce an effluent waste containing less than about 1 wppm organic halide compounds.

The adsorption zone may comprise one or more vessels containing adsorbent which may be installed in the vessels in any suitable manner. A preferred method for the installation of the adsorbent is in a fixed bed arrangement and may be installed in either series or parallel flow. The flow of gas through the adsorption zone is preferably performed in a series manner so that when one of the adsorbent beds or chambers in the series is spent by the accumulation of organic halide compounds thereon, the spent zone may be bypassed while continuing uninterrupted operation through the remaining zone or zones. The spent zone of adsorbent may then be regenerated or the spent adsorbent may be replaced as desired. In a preferred embodiment of the present invention, any purge gas or regeneration gas which is produced during the replacement or regeneration of spent adsorbent is preferably recycled within the process of the present invention to ensure that any and all gaseous effluent streams are essentially free from organic halide compounds.

The flow of the gas through the adsorption zone may be conducted in an upflow, downflow or radial flow manner. The temperature and pressure of the adsorption zone are preferably selected to maintain the gaseous phase.

In the case where the adsorbent is regenerated, the regeneration of the adsorbent may be conducted by any suitable means known to those skilled in the art. For example, the adsorbed organic halide compound may suitably be removed by pressure reduction or gas stripping. Suitable stripping gas, for example, may be selected from the group consisting of hydrogen, nitrogen, steam, effluent gas from an on-line adsorption zone and admixtures thereof.

DESCRIPTION OF THE DRAWING

In the drawing, one embodiment of the subject invention is illustrated by means of a simplified flow diagram in which such details as pumps, instrumentation, heat-exchange and heat-recovery circuits, compressors and similar hardware have been deleted as being non-essential to an understanding of the techniques involved. The use of such miscellaneous appurtenances are well within the purview of one skilled in the art. With reference now to the drawing, an effluent waste gas stream containing organic halide compounds and water vapor is introduced via conduit 1 and is cooled in heat-exchanger 2. The resulting cooled effluent waste gas stream is then introduced via conduit 1 into vapor-liquid separator 3. Any condensed water which is present is removed from vapor-liquid separator 3 via conduit 4 and a first gaseous stream is removed from vapor-liquid separator 3 via conduit 5 and is compressed in compressor 6. The resulting compressed gas is introduced via conduit 5 into cooler 7 and is then introduced via conduit 5 into vapor-liquid separator 9. A recycle gas stream produced during the regeneration of a hereinafter-described adsorption zone is introduced via conduits 8 and 5 into vapor-liquid separator 9. Condensed water vapor is removed from vapor-liquid separator 9 via conduit 10 and recovered. A second gaseous stream is removed from vapor-liquid separator 9 via conduit 11, is compressed in compressor 12, is cooled in cooler 13 and is introduced via conduit 11 into vapor-liquid separator 14. Condensed organic chloride compounds are removed as a liquid stream from vapor-liquid separator 14 via conduit 15 and recovered. A third gaseous stream is removed from vapor-liquid separator 14 via conduit 16 and is introduced into adsorption zone 17. A fourth gaseous stream which is essentially free of organic halide compounds and water vapor is recovered from adsorption zone 17 via conduit 18.

The process of the present invention is further demonstrated by the following illustrative embodiment. This illustrative embodiment is, however, not presented to unduly limit the process of this invention, but to further illustrate the advantages of the hereinabove described embodiments. The following data were not obtained by the actual performance of the present invention, but are considered prospective and reasonably illustrative of the expected performance of the invention.

ILLUSTRATIVE EMBODIMENT

A vent gas stream having the characteristics presented in Table 1 and contaminated with 11.5 weight percent of organic halide compounds and 23 weight percent water is charged at a rate of 100 mass units per hour to a cooler to lower the temperature of the gas stream to about 100° F. (38° C.). The cooled gas stream is compressed in a first compression zone from about 2 psig (14 kPa gauge) to about 25 psig (172 kPa gauge), cooled to about 100° F. (38° C.) and introduced into a vapor-liquid separator which produces 22 mass units per hour of liquid water and a flowing gas stream. This flowing gas stream is compressed to a pressure of 170 psig (1170 kPa gauge), cooled to about 100° F. (38° C.) and introduced into another vapor-liquid separator which produces 10.5 mass units per hour of liquid organic halide compounds and another flowing gas stream containing 6 weight percent of organic halide compounds. This resulting gas stream containing the remaining quantities of organic halide compounds is contacted with an activated carbon adsorbent in an adsorption zone operated at a pressure of about 170 psig (1170 kPa gauge) to produce a final vent gas stream containing less than 1 wppm organic halide compounds.

TABLE 1

WASTE VENT GAS FEEDSTOCK

| Components | Weight Percent |
|---|---|
| Nitrogen | 37.0 |
| Carbon Monoxide | 0.4 |
| Oxygen | 1.6 |
| Methane | 0.1 |
| Ethylene | 1.3 |
| Ethane | 0.1 |
| Carbon Dioxide | 24.4 |
| Vinyl Chloride | 0.5 |
| Chloroethane | 1.4 |
| 1,1 Dichloroethane | 0.3 |
| Chloroform | 1.9 |
| Carbon Tetrachloride | 0.3 |
| 1,2 Dichloroethane | 7.0 |
| Water | 23.2 |
| Argon | 0.5 |

The foregoing description, drawing, and illustrative embodiment clearly demonstrate the advantages encompassed by the process of the present invention and the benefits to be afforded with the use thereof.

What is claimed:

1. A process for the removal of organic halide compounds from an effluent waste gas containing organic halide compounds and water vapor which process comprises:
   (a) compressing said effluent waste gas in a first compression zone to produce a condensed water vapor liquid phase and a first gaseous phase having a pressure greater than that of said effluent waste gas and a reduced concentration of water vapor;
   (b) compressing said first gaseous phase from step (a) in a second compression zone to produce a condensed organic halide liquid phase and a second gaseous phase having a pressure greater than that of said first gaseous phase and having a reduced concentration of organic halide compounds;
   (c) contacting said second gaseous phase containing residual quantities of organic halide compounds in an adsorption zone with an adsorbent which selectively retains organic halide compounds; and
   (d) recovering an effluent waste gas containing reduced quantities of organic halide compounds from said adsorption zone.

2. The process of claim 1 wherein said effluent waste gas contains an organic halide compound selected from the group consisting of vinyl chloride, chloroethane, dichloroethane, dichloroethylene, chloroform and carbon tetrachloride.

3. The process of claim 1 wherein at least a portion of a recycle gas stream produced during regeneration of a portion of said adsorbent is introduced into said second compression zone.

4. The process of claim 1 wherein said first compression zone is operated at conditions which include a pressure from about 10 psig (68.9 kPa gauge) to about 1000 psig (6895 kPa gauge).

5. The process of claim 1 wherein said second compression zone is operated at conditions which include a pressure from about 10 psig (68.9 kPa gauge) to about 1000 psig (6895 kPa gauge).

6. The process of claim 1 wherein said effluent waste gas containing reduced quantities of organic halide compounds in step (d) contains less than about 1 wppm organic halide compounds.

7. The process of claim 1 wherein said adsorbent is regenerated utilizing a stripping gas selected from the group consisting of hydrogen, nitrogen, steam, effluent gas from an on-line adsorption zone and admixtures thereof.

8. The process of claim 1 wherein said adsorbent is selected from the group consisting of alumina, silica, silica gel, silica-alumina, clay, crystalline aluminosilicates, activated carbon and admixtures thereof.

9. A process for the removal of organic chlorides from an effluent waste gas containing organic chloride and water vapor which process comprises:
   (a) compressing said effluent waste gas in a first compression zone to produce a condensed water vapor liquid phase and a first gaseous phase having a pressure greater than that of said effluent waste gas and a reduced concentration of water vapor;
   (b) compressing said first gaseous phase from step (a) in a second compression zone to produce a condensed organic chloride liquid phase and a second gaseous phase having a pressure greater than that of said first gaseous phase and having a reduced concentration of organic chloride;
   (c) contacting said second gaseous phase containing residual quantities of organic chloride in an adsorption zone with an adsorbent which selectively retains organic chloride; and
   (d) recovering an effluent waste gas containing reduced quantities of organic chloride from said adsorption zone.

10. The process of claim 9 wherein said effluent waste gas contains a chloride compound selected from the group consisting of vinyl chloride, chloroethane, dichloroethane, dichloroethylene, chloroform and carbon tetrachloride.

11. The process of claim 9 wherein at least a portion of a recycle gas stream produced during regeneration of a portion of said adsorbent is introduced into said second compression zone.

12. The process of claim 9 wherein said first compression zone is operated at conditions which include a pressure from about 10 psig (68.9 kPa gauge) to about 1000 psig (6895 kPa gauge).

13. The process of claim 9 wherein said second compression zone is operated at conditions which include a pressure from about 10 psig (68.9 kPa gauge) to about 1000 psig (6895 kPa gauge).

14. The process of claim 9 wherein said effluent waste gas containing reduced quantities of organic halide compounds in step (d) contains less than about 1 wppm organic halide compounds.

15. The process of claim 9 wherein said adsorbent is regenerated utilizing a stripping gas selected from the group consisting of hydrogen, nitrogen, steam, effluent gas from an on-line adsorption zone and admixtures thereof.

16. The process of claim 9 wherein said adsorbent is selected from the group consisting of alumina, silica, silica gel, silica-alumina, clay, crystalline aluminosilicates, activated carbon and admixtures thereof.

* * * * *